E. M. HAMILTON AND M. HAMBURGER.
GARAGE.
APPLICATION FILED AUG. 26, 1919.

1,340,045.

Patented May 11, 1920.
2 SHEETS—SHEET 1.

Inventors:
Edward M. Hamilton and
Mark Hamburger
by Spear, Middleton, Donaldson & Hall
Attys E. M. HAMILTON AND M. HAMBURGER.
GARAGE.
APPLICATION FILED AUG. 26, 1919.
1,340,045.
Patented May 11, 1920.
2 SHEETS—SHEET 2.
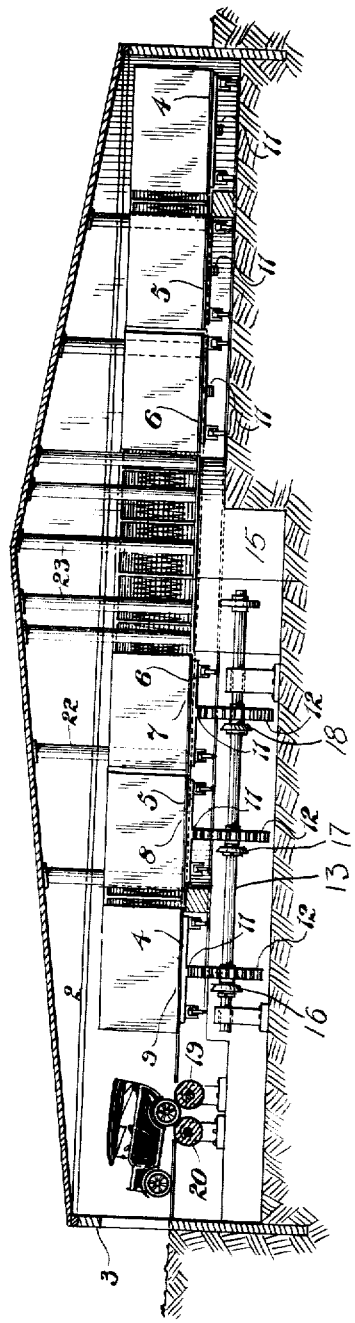
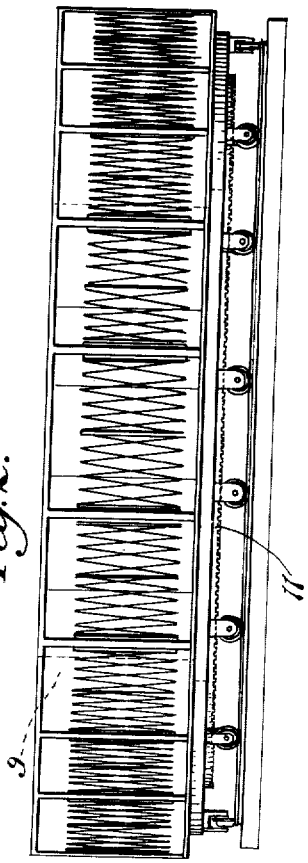
Inventors:
Edward M. Hamilton and
Mark Hamburger.
by Spear, Middleton, Donaldson & Hall
Attys.

UNITED STATES PATENT OFFICE.

EDWARD M. HAMILTON AND MARK HAMBURGER, OF BALTIMORE, MARYLAND.

GARAGE.

1,340,045.     Specification of Letters Patent.     Patented May 11, 1920.

Application filed August 26, 1919. Serial No. 319,947.

*To all whom it may concern:*

Be it known that we, EDWARD M. HAMILTON and MARK HAMBURGER, citizens of the United States, and residents of Baltimore, Maryland, have invented certain new and useful Improvements in Garages, of which the following is a specification.

One object of the invention is to economize space in the garage and increase its capacity, practically all of the area being utilized for holding the cars. Another object of the invention is to enable the car owners to maintain individual control over their cars while stored in the garage, separate compartments or separate garages being provided, one for each car.

The invention is shown in the accompanying drawings in which—

Fig. 2 is a detail view showing a number of individual sections or compartments mounted upon one of the movable platforms.

Fig. 3 is a vertical sectional view through the structure.

Figure 1:
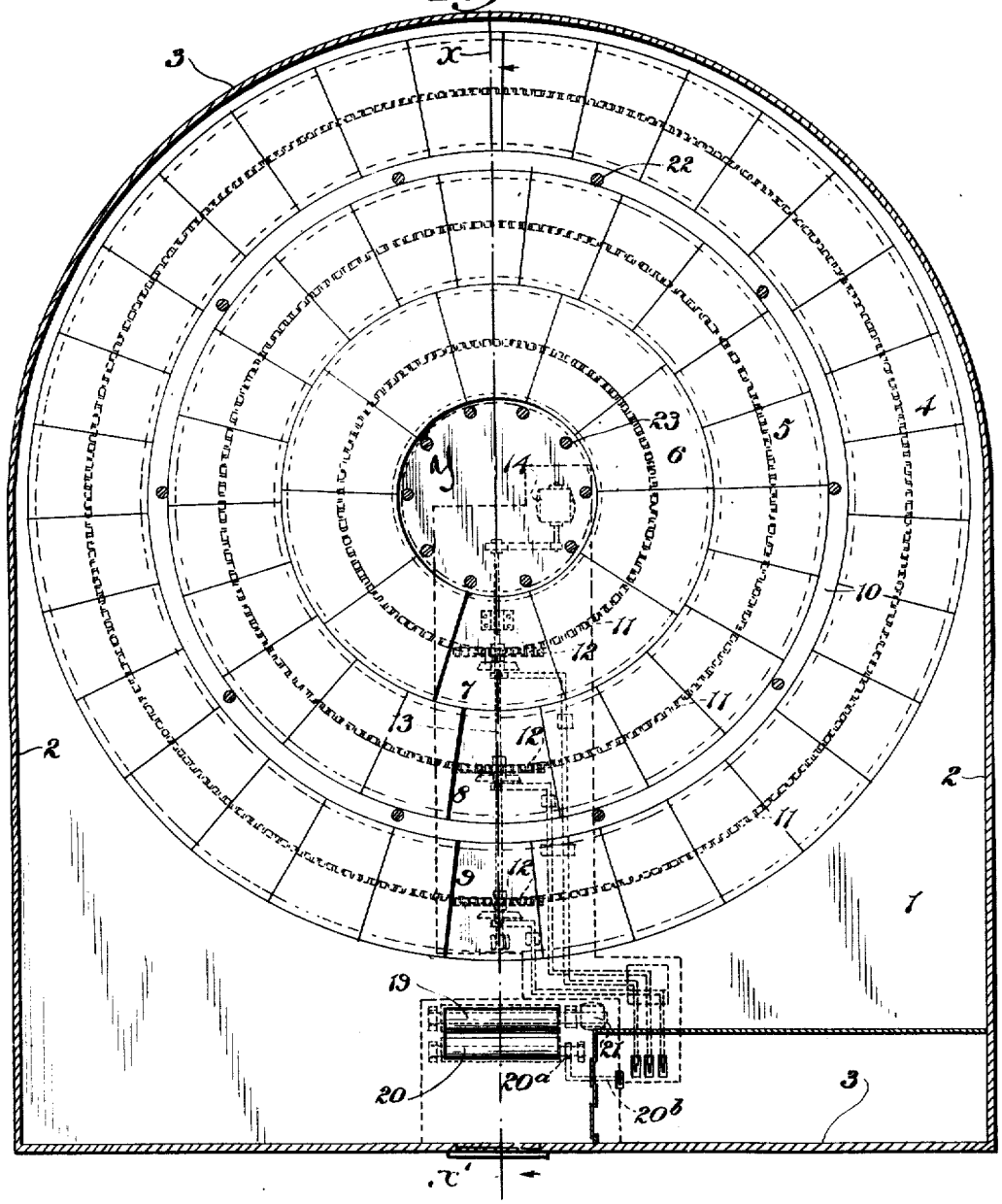
Figure 1 is a plan view of the structure embodying our invention.

In these drawings 1 indicates the outer wall which may be formed of any suitable material, this preferably being curved on the arc of a circle at its rear portion, having straight sides at 2 and straight front at 3.

Within the space included within these walls we arrange a number of circular rotary platforms 4, 5 and 6 although we do not limit ourselves to the number of these platforms. Each platform carries a number of compartments or individual garages and these are arranged radially in respect to the center of the structure. They are located close together and they occupy the entire circuit of each platform excepting for the passage way at 7, 8 and 9, this passage way being provided by omitting one of the individual compartments or garages from each of the platforms. Each of the compartments forms a complete closure or garage made up of sides and front and rear walls, but the roof of each individual compartment or garage may be formed of wire netting so that light from the lighting system of the structure may have access to each compartment. Each compartment has doors so as to permit the entrance or exit of the automobile into or from the compartment.

In order to get access to the various compartments for the exit or entrance of the automobile to be stored therein the platform bearing this compartment is rotated so that the compartment is brought to the front center line of the structure indicated by the reference characters $x$—$x'$, this being in line with the front door of the structure indicated at $x'$. The platforms, when normally at rest, have their spaces 7, 8 and 9 in alinement and the bringing of any one of the compartments into position for the exit or entrance of an automobile will bring said compartments in line with the space of the outer platform or the next outer platform so that the automobile can be run out or run in through this space. There is also a central space within the central platform indicated at $y$. This may be used as a space for washing cars and access to the inner row or circle of garages may be afforded through this central space, and doors at the inner ends of the inner row of compartments.

Access may also be had to the compartments of the two outer rows through a space or passage way 10 so that while the two outer rows remain at rest an owner or renter may walk through the passage 10 and gain access to his compartment.

The platforms may be rotated in any suitable way and we have shown a conventional form of driving mechanism consisting of the circular racks 11 and the gears 12 on a shaft 13, which is driven from any suitable motor 14 in the office 15. The gears 12 are shiftable into or out of engagement with the circular racks and for this purpose individual operating connections are shown at 16, 17 and 18 so that the attendant in the office may rotate either one of the platforms to bring the desired compartment to the front in line with the exit or entrance passage.

We also provide a starting platform or roller indicated at 19 and in front of this there is an idle roller 20. The automobile will be positioned with its rear wheels resting on these rollers so that by rotating the roller 19 by any suitable form of motor 21 the rear wheels of the car may be driven to start the engine. During this action the car will remain stationary by resting on the idle roller. After the engine is started the idle roller may be prevented from rotating by a suitable brake as at $20^a$ operated by a lever $20^b$ and when so arrested the rear wheels of the car will get the necessary traction on this idle roller to propel the car forward.

As shown in Fig. 3 the roof of the structure may be of substantially conical form and supported by pillars 22, 23, arranged in radial rows. The pillars 22 may rest upon a foundation which forms the floor of the walk 10.

Instead of having the outer walls of the structure curved at the rear the structure may be of rectangular form in plan and the spaces at the corners may be utilized for storage or other purposes.

The central row of compartments may be shorter than the outer rows to receive, for instance, Ford cars, but we do not limit ourselves to any particular proportions or relative proportions.

The individual compartments may have electric lights therein with a trolley system so that each owner can operate the individual light or there may be a lighting system for the entire structure, lights being so disposed as to shed their rays into the individual compartments.

By our invention we provide private garages, but at the same time public service is afforded the car owners.

It will be understood that the platforms may be employed without the compartments. For instance, the platforms may have spaces designated thereon in any suitable way to receive the cars without inclosing them.

The doors to the compartments may be in the form of folding gratings and there may be a door at both the front and rear of each compartment so that a car may be moved forward to the exit or backward to the rear washing platform. This form of door provides for light and ventilation.

In most private garages there is danger of the owner or attendant being overcome by gas and deaths have resulted from this cause when starting up or testing the engine. In our improvement the individual garages while thoroughly protected against the weather and against access of unauthorized persons are open for the free circulation of air and the escape of gas and for the dilution of any gas that may remain.

We claim as our invention:

1. A garage comprising a plurality of circular platforms arranged concentric with each other, each having a number of individual compartments or sections thereon for receiving automobiles, a passage way between two of the circular platforms providing a walk whereby access may be had by an owner to his compartment when the platform is stationary and means for rotating the platforms to bring the compartments to the entrance space, substantially as described.

2. A garage comprising a plurality of concentric individually rotatable platforms, each having an outlet, compartments mounted radially thereon having solid back walls, the door openings of the inner compartments being closed by the solid wall of the next outer compartment except when the next outer compartment is rotated to bring its outlet in alinement with the desired inner compartment.

In testimony whereof we affix our signatures.

EDWARD M. HAMILTON.
MARK HAMBURGER.